Jan. 30, 1962  M. E. DUMESNIL  3,019,198
THERMISTOR COMPOSITION
Filed Jan. 18, 1961  2 Sheets-Sheet 1

CHANGE OF RESISTANCE WITH TEMPERATURE OF PRINTED THERMISTOR OF EXAMPLE 19.

INVENTOR
MAURICE EDWARD DUMESNIL

BY
ATTORNEY

United States Patent Office 3,019,198
Patented Jan. 30, 1962

1

3,019,198
THERMISTOR COMPOSITION
Maurice E. Dumesnil, Metuchen, N.J., assignor to E. I. du Pont de Nemours and Company, Wilmington, Del., a corporation of Delaware
Filed Jan. 18, 1961, Ser. No. 83,560
14 Claims. (Cl. 252—521)

This invention relates to electrical resistors characterized by a decrease in electrical resistance with an increase in temperature. Such resistors are commonly referred to as thermistors. Many interesting applications for commercial and industrial use of thermistors have been developed in the last few years, and thermistors are available in a large variety of types covering a broad range of electrical characteristics. Thermistors are ideal for temperature controls because simple electrical and electronic circuits can be made to give great sensitivity and accuracy.

This application is a continuation-in-part of my co-pending application Serial No. 749,249, filed July 17, 1958, now abandoned.

Mixtures of metal oxides have been used heretofore for the production of thermistors. Such previously known thermistors made with mixtures of oxides were very difficult to reproduce or duplicate. In the first place, such previously known thermistors were dependent upon a specific degree of oxidation of the oxides present; in general the lower the degree of oxidation the lower the resistance. It is exceedingly difficult to prepare conducting materials with a uniform conductance by using oxides in their lower states of oxidation. The degree of oxidation of such formerly used oxide mixtures was determined by the oven or furnace temperature and upon the oxidation or reduction conditions surrounding the oxides during firing. Slight changes or variations in oxidation or reduction conditions will produce wide variations in the specific resistivity of a material. Moreover, most oxides produce rather high values of specific resistivity.

It is an object of this invention to produce a new combination of metal oxides which may be easily fired to produce a useful thermistor material.

It is another object of this invention to produce new and improved thermistors.

It is another object of this invention to produce a new combination of metal oxides which may be readily fired at atmospheric oxidizing conditions to produce an easily reproducible thermistor of good stability.

It is yet another object of this invention to provide a thermistor material which may be mixed with a vitreous glass frit and a liquid vehicle to produce easily duplicatable printed thermistors.

Other objects of this invention will appear hereinafter.

The objects of this invention may be accomplished, in general, by mixing together finely divided cerium oxide, strontium oxide and manganese oxide. These oxides may be admixed in many given proportions to produce a novel combination that may be pressed into a desired form and fired at the sintering temperature thereof to obtain a readily duplicatable thermistor.

Moreover, such thermistor material may be ground and mixed with a glass frit and a liquid vehicle to produce a composition that can be applied to the surface of a ceramic dielectric and fired to form a fixed stable thermistor.

The details of the invention will be more apparent by reference to the following description when taken in connection with the accompanying illustrations, in which.

Figure 1:
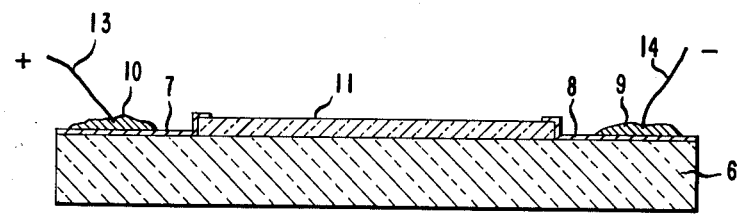
FIGURE 1 is a cross sectional view of one embodiment of a thermistor constructed in accordance with the invention.

Referring to the drawings, 6 designates a ceramic dielectric base on which is laid down a layer 11 composed of a mixture of ceric, strontium and manganese oxides in a glass frit, for example, a lead borosilicate frit, and an organic binder such as methyl cellulose. The frit-oxide layer may be applied by means of a screen stencil or in any other desired manner. The aggregate structure is then fired at a temperature between 1000° F. and 1600° F. for at least 10 minutes depending on the softening point of the glass frit binder. Layers 7 and 8 of finely divided silver in glass frit such as described in Knox U.S. Patent No. 2,385,580 or in the copending application of Maurice Edward Dumesnil, Serial No. 737,200, filed May 23, 1958, are then applied on opposite ends of the layer 11 and fired at a temperature between 1000° F. and 1500° F. for 10 minutes sufficiently to fuse the glass frit and coalesce the silver particles to form two oppositely disposed electrodes in contact with the thermistor layer 11. It is also possible to print and fire the silver contacts first and then print and fire the thermistor layer at a lower temperature, the required time and temperature of firing of the thermistor being dependent on the viscosity of the glass frit binder chosen. Lead wires 13 and 14 may then be connected to the silver electrodes 7 and 8 by means of solder layers 10 and 9 to produce a finished thermistor.

Figure 2:
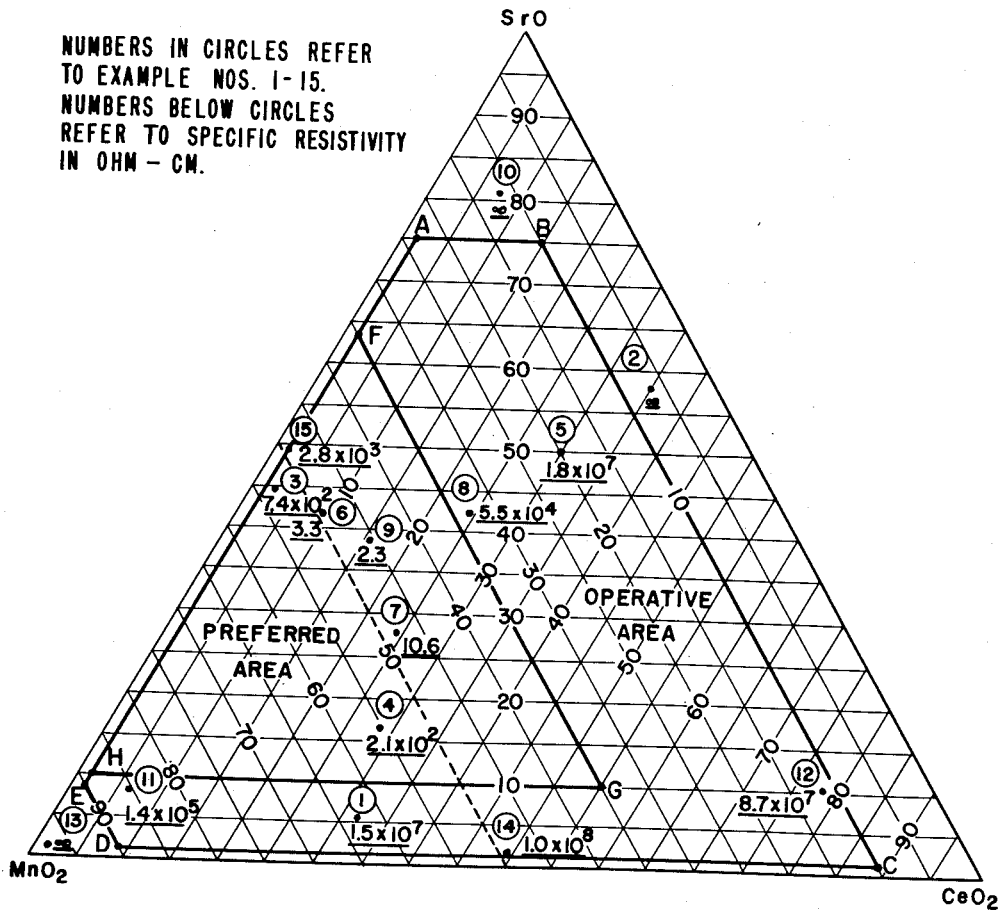
FIGURE 2 is a ternary diagram showing the preferred and operative ranges of cerium oxide, strontium oxide, manganese oxide mixtures for use in the production of thermistors.

FIGURE 2 is a ternary diagram showing the compositions of the three-component system $MnO_2$, $SrO$ and $CeO_2$ in mole percentages. The lowest volume resistivity obtainable is about 2.5 ohms at 38 mole percent $SrO$, 46 mole percent $MnO_2$ and 16 mole percent $CeO_2$. The volume resistivity can be varied from about 2.5 ohm-cm. to infinity by varying the proportions of the three oxides as will be seen from the examples hereinafter set forth.

The useful operative ranges of the three-component compositions are outlined on the ternary diagram by the area designated by letters A, B, C, D and E. The preferred ranges are shown by the area designated by letters F, G and H.

In the diagram the numbers in circles refer to the example numbers of the examples in this application and the numbers below the examples refer to the specific, or volume, resistivity of the examples.

Figure 3:
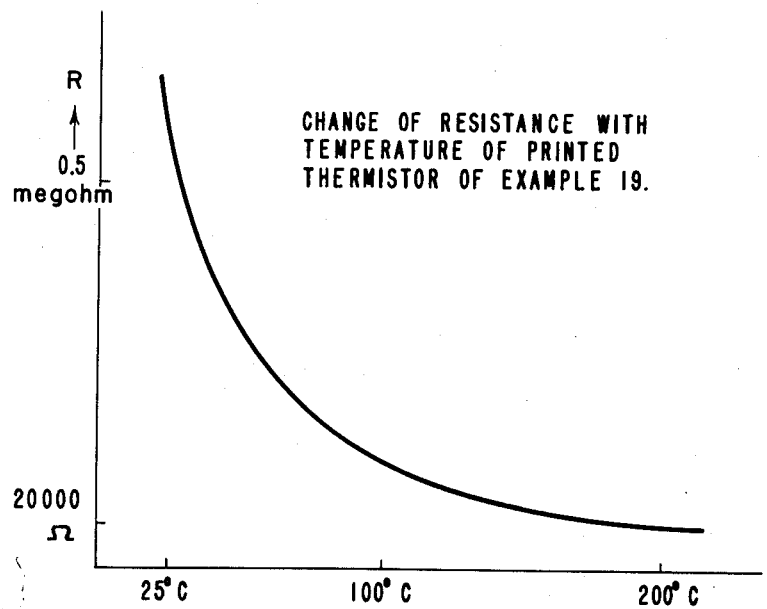
FIGURE 3 is a diagram showing the change in resistivity with change in temperature of the printed thermistor disclosed in Example 4.

FIGURE 3 shows the approximate conformation of a curve representing the plotting of surface resistivities against changes in temperature of the thermistor described in Example 19 below. At 25° C. the thermistor will have a resistivity of about 0.5 megohm and at about 210° C. the resistivity will be about 20,000 ohms.

As generally indicated above, the three oxides in the oxide mixtures of this invention may be mixed in many proportions, it being necessary only that the oxides be present in the proportions outlined in area ABCDE of the ternary diagram. The ease of reproducibility and the firing at atmospheric conditions to produce stable, reliable thermistors will take place whether the oxides are mixed in equal amounts or whether one or two of the oxides be present in only very small amounts.

The cerium oxide may be ceric ($CeO_2$) or cerous ($Ce_2O_3$) oxide. The strontium oxide will, of course, be strontia (SrO), the only known strontium oxide (excluding, of course, unused isotopic forms). The manganese oxide may be manganous oxide (MnO), manganic oxides ($Mn_3O_4$ and $Mn_2O_3$), manganese dioxide ($MnO_2$), manganese trioxide ($MnO_3$) or manganese heptaoxide ($Mn_2O_7$). Moreover, instead of using oxides compounds that will yield the oxides under the firing conditions may be used, if desired, for example, carbonates, nitrates, or hydroxides. The oxygen content of the final fired thermistor powder will depend upon the proportions of the powdered oxides used in the preparation of the thermistor. Although I do not wish to be limited to any particular theory of how the oxides may combine during firing to produce a thermistor composition, I believe that the reason for the desirable ease of preparation of thermistors of desirable resistivity and reproducibility is in large part due to the fact that both strontium and cerium have nearly identical ionic radii so that one can replace the other in a crystal lattice. Since cerium can have only a charge of +3 and +4 and strontium +2, in order to accommodate the various charges, manganese will have to adjust its oxidation level to compensate for the extra electrons that cerium may supply in the strontium manganate crystal lattice.

The oxides, before mixing, should be in finely divided form, that is to say, in a maximum size of 100-mesh; finer sizes, if thoroughly mixed will, of course, produce more homogeneous products. The mixing should be done in a thorough manner to obtain a substantially homogeneous product. This may, for example, be done by dry milling the mixture for a period of one or more hours in conventional milling equipment.

The thoroughly mixed oxide powders are then fired to the thermistors of this invention. Before firing, it is preferred to press the oxide powder mixture into a desired form of pellet to which conductors may later be attached. The pressing should be done in a press at a pressure of 100 pounds per square inch or more. Pressures of one to twenty thousand pounds per square inch are preferred.

The pressed pellets are then fired in a furnace, for example, a muffle furnace open to the atmosphere. No special oxidizing or reducing conditions are necessary. This is a special advantage of the particular mixture of oxides of this invention. The firing temperature of the oxide pellets should be at least 1100° C. and preferably should not exceed 1400° C. At a lower temperature, the oxides are not properly sintered together, and at higher temperatures, the oxides may fuse to a liquid form which is not generally desired. In any event, the maximum temperature should not exceed 2000° C. to avoid possible volatilization of one or more of the oxides. The firing may be carried out at any desired speed and is preferably held at a peak firing temperature for a period of 15 minutes to several hours. It is very desirable that the cooling of the fired oxide mixture be carried out over a period of at least 8 hours.

The fired pellets may then be used in the construction of thermistors by simply soldering or fusing electrical conductors to opposing surfaces of the pellets. If further improvement in the reproducibility of the electrical characteristics is desired, the pellets may be ground, the powder repressed and refired, thus offering better homogeneity in the thermistor structure. The fired pellets may be crushed into a thermistor powder, for example, a powder having a particle size less than 100-mesh and mixed with a quantity of similarly finely divided glass frit or enamel. The proportions of glass to thermistor powder may vary between 65% to 95% by weight of thermistor powder to 35% to 5% of glass. Any glass frit commonly used in the ceramics arts may be used for this purpose; for example, the glass may be a lead, cadmium, barium, or other metal borosilicate glass. The glass-thermistor powder may then be mixed with a liquid vehicle (for suitable vehicles see Knox, U.S. Patent No. 2,385,580) to form a viscous liquid or paste for application to a glass or other ceramic dielectric surface that can be fired at the glass maturing temperature to produce a thermistor, for example, of the type shown in FIGURE 1 of the drawings. Fired printed thermistors can thus be obtained with a resistance per square at room temperature of the order of 10,000 ohms to over several megohms. The variation in ratio of the oxides or the addition of the glass to produce printed thermistors as above described does not materially interfere with the temperature coefficient of the resultant thermistor. Either one of the fired oxide thermistors or the crushed thermistor powder-glass thermistors will have a temperature coefficient, as measured at 25° C. of about —4% per degree centigrade, thus making such compositions very useful as temperature sensing devices.

Instead of using pure cerium oxide in the above-described mixtures of oxides, a mixture of rare earth oxides of the lanthanide series can be used with similar results, although with some increase in volume resistivity, but the cerium oxide in such a rare earth oxide mixture must comprise at least 50% by weight thereof.

The following examples are given to illustrate the invention, it being understood that the invention is not to be limited to such specific details.

In the following tabulated Examples 1 to 15, inclusive, the three oxide components are given in mole percent. In all these examples the mixtures of $CeO_2$, SrO, and $MnO_2$ powders were first ball-milled in acetone and precalcined at 800° C. The precalcined oxide mixture is then ground to a particle size of less than 325 mesh (about 0.5 to 10 microns). Ten gram pills were then pressed at a pressure of about 2,000 lbs. per square inch and calcined at 1,200° C. for 2 hours. Silver paste electrodes were applied on each side of the pills and resistance measurements made with an ohmeter. These measured resistances are shown as the measured resistance values in columns 2 and 3 of Table II.

Examples 2, 10 and 13 have a resistance value of infinity and, as will be seen from the ternary diagram, are excluded from the operative composition. The data indicate that the three oxides may be mixed in any proportions within the ranges of 10 to 90 mole percent of $MnO_2$, 1 to 70 mole percent of SrO and 1 to 89% of $CeO_2$.

The preferred ranges are 35 to 89 mole percent $MnO_2$, 10 to 64 mole percent SrO and 1 to 55 mole percent $CeO_2$.

TABLE I

| Example No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Mole percent: | | | | | | | | | | | | | | | |
| SrO | 5.47 | 57.9 | 44.0 | 16.3 | 49.5 | 41.5 | 27.1 | 41.7 | 38.5 | 81.8 | 8.9 | 10 | 1 | 1 | 49.5 |
| $MnO_2$ | 63.0 | 7.2 | 53.1 | 55.5 | 20.7 | 49.5 | 48.4 | 33.1 | 45.9 | 12.0 | 85.6 | 12 | 98 | 49.5 | 49.5 |
| $CeO_2$ | 31.5 | 34.8 | 2.8 | 28.0 | 29.7 | 8.8 | 24.4 | 25.0 | 15.4 | 6.2 | 5.4 | 77.9 | 1 | 49.5 | 1 |

TABLE II

| Example No. | Measured Resistance Value at 25° C. | Measured Resistance Value at 125° C. | Change in Resistance from 25° C. to 125° C. | Specific Resistivity ρ 0 at 25° C. |
|---|---|---|---|---|
| | | | Percent | |
| 1 | 6 megohms | 2.4 megohms | −60 | $1.5 \times 10^7$ Ω-cm. |
| 2 | ∞ | ∞ | | |
| 3 | 290 Ω | 60 Ω | −80 | $7.4 \times 10^2$ |
| 4 | 92.8 Ω | 17 Ω | −82 | $2.1 \times 10^2$ |
| 5 | 7.5 megohms | 3.2 megohms | −60 | $1.8 \times 10^7$ |
| 6 | 1.3 Ω | 0.75 Ω | −42 | 3.3 |
| 7 | 4.7 Ω | 1.7 Ω | −64 | 10.6 |
| 8 | 26.300 Ω | 7.70 Ω | −71 | $5.5 \times 10^4$ |
| 9 | 0.95 Ω | 0.8 Ω | −36 | 2.5 |
| 10 | ∞ | ∞ | | |
| 11 | 58.20 Ω | 11.60 Ω | −80 | $1.4 \times 10^5$ |
| 12 | 35 megohms | 13 megohms | −80 | $8.7 \times 10^7$ |
| 13 | ∞ | ∞ | | |
| 14 | 38 megohms | 15.2 megohms | −60 | $1.0 \times 10^8$ |
| 15 | 1,000 Ω | 200 Ω | −80 | $2.8 \times 10^3$ |

*Example 16*

A mixture of 150 grams of ceric oxide ($CeO_2$), 130 grams of strontium carbonate ($SrCO_3$), and 206 grams of manganese carbonate ($MnCO_3$) was prepared by grinding them in a dry mix ball-mill for a period of six hours. The mixture was pressed at a pressure of 5000 pounds per square inch in a form to produce pellets having a height and a diameter of about 1 inch. These pellets were fired in a muffle furnace open to the atmosphere at a temperature of 1200° C., this temperature being maintained for a period of one hour. The furnace was then permitted to gradually cool until room temperature was reached after sixteen hours. The pellets were then provided with electrodes on opposite sides thereof by soldering lead wires thereto. The thermistors thus constructed had a volume resistivity of the order of five ohms per cube. The temperature coefficient of resistivity was −4% per degree centigrade at 25° C.

*Example 17*

A mixture of 180 grams ceric oxide, 105 grams strontium carbonate and 206 grams manganese carbonate was treated as in Example 1 and yielded a material whose resistivity was equal to 10,000 ohms per cube.

*Example 18*

A mixture of 230 grams ceric oxide, 65 grams strontium carbonate and 206 grams manganese carbonate was treated as in Example 1 and yielded a material whose resistivity was 500,000 ohms per cube.

*Example 19*

70 grams of thermistor mix from Example 1 were mixed with 30 grams of a lead borosilicate glass frit (PbO 63.5, boric acid 21.6, $SiO_2$ 8.65, CdO 6.25 percent by weight) and dispersed in 40 grams beta-terpineol viscosified with ethyl cellulose. Prints of 7 x 3.5 mm. fired at 760° C. for 15 minutes were obtained whose resistance was 0.5 megohm at 25° C. The resistance of these prints varied as follows with temperature:

28° C.=450,000 Ω
31° C.=400,000 Ω
44° C.=290,000 Ω
66° C.=116,000 Ω
118° C.=70,000 Ω
210° C.=20,000 Ω

The prints had excellent abrasion resistance and stability.

Throughout the specification and claims any reference to parts, proportions, and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. As a new article of manufacture, a mixture of finely divided powder consisting essentially of a cerium compound, a strontium compound and a manganese compound, the mixture containing said compounds in such proportions that upon firing at a temperature of 1100° C. the resultant composition will be composed of between 10 and 90 mole percent $MnO_2$, between 1 and 70 mole percent SrO and between 1 and 89 mole precent $CeO_2$.

2. As a new article of manufacture, a mixture of finely divided powder consisting essentially of a cerium compound, a strontium compound, and a manganese compound, which compounds upon firing at a temperature of at least 1100° C. will be composed of cerium oxide, strontium oxide, and manganese oxide, said compounds being present in the approximate proportions to produce a mix having a molar ratio of about 1:1:2 cerium oxide:strontium oxide:manganese oxide.

3. As a new article of manufacture, a mixture of finely divided powder consisting essentially of 10 to 90 mole percent $MnO_2$, 1 to 70 mole percent SrO, and 1 to 89 mole percent $CeO_2$.

4. As a new article of manufacture, a mixture of finely divided powder consisting essentially of cerium oxide, strontium carbonate and manganese carbonate in such proportions that upon firing at a temperature of 1100° C. the resultant composition will be composed of between 10 and 90 mole percent $MnO_2$, between 1 and 70 mole percent SrO and between 1 and 89 mole percent $CeO_2$.

5. As a new article of manufacture, a mixture of finely divided powder consisting essentially of a cerium oxide, a strontium oxide, and a manganeses oxide in the molar ratio of 1:1:2 cerium oxide:strontium oxide:manganese oxide.

6. A thermistor composition consisting essentially of 10 to 90 mole percent $MnO_2$, 1 to 70 mole percent SrO and 1 to 89 mole percent $CeO_2$, said oxides being fired in intimate admixture at a temperature between 1100° C. and 2000° C.

7. A thermistor composition consisting essentially of cerium, strontium and manganese oxides in the approximate molar proportion of 1:1:2 of cerium, strontium and manganese oxide, said oxides fired in intimate admixture at a temperature of at least 1100° C.

8. A thermistor composition consisting essentially of 10 to 90 mole percent $MnO_2$, 1 to 70 mole percent SrO and 1 to 89 mole percent $CeO_2$ in admixture with a glass frit.

9. A thermistor composition consisting essentially of 10 to 90 mole percent $MnO_2$, 1 to 70 mole percent SrO and 1 to 89 mole percent $CeO_2$ in admixture with a glass frit and an organic vehicle.

10. A thermistor composition consisting essentially of 10 to 90 mole percent $MnO_2$, 1 to 70 mole percent SrO and 1 to 89 mole percent $CeO_2$ in admixture with a glass frit and an organic vehicle, said solid materials being present in the proportion of 65% to 95% cerium, strontium and manganese oxides, and 5% to 35% of glass frit.

11. A thermistor consisting essentially of two spaced conducting electrodes and, positioned in contact with said electrodes, a solid comprising a uniform aggregate of 10 to 90 mole percent $MnO_2$, 1 to 70 mole percent SrO, and 1 to 89 mole percent $CeO_2$, said oxides fired in intimate admixture at a temperature of between 1100° C. and 2000° C.

12. A thermistor consisting essentially of two spaced conducting electrodes and, positioned in contact with said electrodes, a solid comprising between 65% and 95% by weight of a uniform aggregate of 10 to 90 mole percent $MnO_2$, 1 to 70 mole percent SrO, and 1 to 89 mole percent $CeO_2$, and 5% to 35% of a glass, said oxides and glass fired in intimate admixture with each other at a temperature of between 1100° C. and 2000° C.

13. The process of producing a thermistor composition which comprises mixing in homogeneous admixture finely divided cerium, strontium and manganese compounds in such proportions that upon firing the resultant composition will consist essentially of 10 to 90 mole percent $MnO_2$, 1 to 70 mole percent SrO and 1 to 89 mole percent $CeO_2$, firing said mix at a temperature between 1100° C. and 2000° C. for at least 15 minutes, and gradually cooling said fired mix over a period of at least 8 hours.

14. The process of producing a thermistor composition which comprises mixing in homogeneous admixture finely divided cerium, strontium and manganese compounds in such proportions that upon firing the resultant composition will consist essentially of 10 to 90 mole percent $MnO_2$, 1 to 70 mole percent SrO and 1 to 89 mole percent $CeO_2$, pressing said admixture at a pressure of at least 100 pounds per square inch into a solid aggregate, firing said aggregate at a temperature between 1100° C. and 2000° C. for at least 15 minutes, and gradually cooling said fired aggregate over a period of at least 8 hours.

References Cited in the file of this patent

UNITED STATES PATENTS

| | | |
|---|---|---|
| 2,703,354 | Wainer | Mar. 1, 1955 |
| 2,976,505 | Ichikawa | Mar. 21, 1961 |

FOREIGN PATENTS

| | | |
|---|---|---|
| 1,049,048 | France | Aug. 12, 1953 |

OTHER REFERENCES

Levine: "Rare Earths in Ceramics," Ceramic Age, October 1957, pp. 29, 30, and 31.